US012681200B2

(12) United States Patent
Ramos Cordova et al.

(10) Patent No.: US 12,681,200 B2
(45) Date of Patent: Jul. 14, 2026

(54) METHOD, APPARATUS, AND COMPUTER PROGRAM FOR DETECTING ONE OR MORE OBJECTS IN THE SEA FLOOR

(71) Applicant: Fraunhofer-Gesellschaft zur Foerderung der angewan, Munich (DE)

(72) Inventors: Carlos Ramos Cordova, Bremen (DE); Benedict Preu, Bremen (DE); Nikolas Roemer-Stange, Bremen (DE); Hanno Keil, Bremen (DE); Volkhard Spiess, Bremen (DE); Stefan Wenau, Bremen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 877 days.

(21) Appl. No.: 17/597,035

(22) PCT Filed: Jun. 25, 2020

(86) PCT No.: PCT/EP2020/067864
§ 371 (c)(1),
(2) Date: Dec. 23, 2021

(87) PCT Pub. No.: WO2020/260474
PCT Pub. Date: Dec. 30, 2020

(65) Prior Publication Data
US 2022/0317323 A1     Oct. 6, 2022

(30) Foreign Application Priority Data
Jun. 28, 2019     (DE) .................... 10 2019 117 587.9

(51) Int. Cl.
*G01V 1/38*          (2006.01)
*G01V 1/30*          (2006.01)

(52) U.S. Cl.
CPC ................ *G01V 1/38* (2013.01); *G01V 1/303* (2013.01); *G01V 1/307* (2013.01); *G01V 2210/6222* (2013.01); *G01V 2210/63* (2013.01)

(58) Field of Classification Search
CPC ........ G01V 1/001; G01V 1/303; G01V 1/307; G01V 1/362; G01V 1/38; G01V 2210/6222; G01V 2210/63
See application file for complete search history.

(56) References Cited

U.S. PATENT DOCUMENTS

| | | | | |
|---|---|---|---|---|
| 4,570,246 A | * | 2/1986 | Herkenhoff | ............ G01V 1/306 367/68 |
| 4,802,146 A | * | 1/1989 | Moeckel | ................ G01V 1/362 367/51 |

(Continued)

FOREIGN PATENT DOCUMENTS

| | | |
|---|---|---|
| CN | 101581785 B | 12/2011 |
| CN | 105137480 | 12/2015 |

(Continued)

OTHER PUBLICATIONS

Kanasewich, Imaging discontinuities on seismic sections, Geophysics, vol. 53, No. 3 (Mar. 1988); p. 334-345 (Year: 1988).*

(Continued)

*Primary Examiner* — Michael J Dalbo
(74) *Attorney, Agent, or Firm* — 2SPL Patent Attorneys PartG mbB; Kieran O'Leary

(57) ABSTRACT

Embodiments deal with a method, a computer program as well as an apparatus for detecting one or more objects in the sea floor. The method comprises obtaining a receiver signal. The receiver signal is based on a scattering of multiple acoustic signals at the one or more objects in the sea floor. The receiver signal is generated by a plurality of receivers. The method further comprises grouping portions of the receiver signal to points of a detection grid. The detection (Continued)

grid represents a grid at the points of which the one or more objects are being localized. The method further comprises performing a travel time correction of the portions of the receiver signal with respect to the points of the detection grid. The method further comprises combining the travel time corrected portions of the receiver signal at the points of the detection grid. The method further comprises detecting the one or more objects at the points of the detection grid based on the combination of the travel time corrected portions of the receiver signal. The detection of the one or more objects is based on the scattering of the multiple acoustic signals at the one or more objects.

20 Claims, 4 Drawing Sheets

(56)                References Cited

U.S. PATENT DOCUMENTS

| | | | | |
|---|---|---|---|---|
| 5,103,429 | A | 4/1992 | Gelchinsky | |
| 5,287,328 | A * | 2/1994 | Anderson | G01V 1/364 |
| | | | | 367/43 |
| 5,886,661 | A | 3/1999 | Harrison et al. | |
| 5,978,314 | A * | 11/1999 | Pham | G01V 1/303 |
| | | | | 702/14 |
| 8,400,872 | B2 | 3/2013 | Gulgné et al. | |
| 8,400,874 | B2 | 3/2013 | Gulgné et al. | |
| 8,867,307 | B2 | 10/2014 | Gulgné et al. | |
| 9,075,154 | B2 | 7/2015 | Gulgné | |
| 9,304,224 | B2 | 4/2016 | Gulgné | |
| 9,316,755 | B2 | 4/2016 | Gulgné et al. | |
| 9,476,997 | B2 | 10/2016 | Pace et al. | |
| 9,568,627 | B2 | 2/2017 | Gulgné et al. | |
| 2005/0090987 | A1 * | 4/2005 | Amundsen | G01V 1/284 |
| | | | | 702/14 |
| 2007/0223306 | A1 | 9/2007 | Toennessen | |
| 2008/0025146 | A1 | 1/2008 | Welker | |
| 2008/0239873 | A1 | 10/2008 | Tsurugaya et al. | |
| 2009/0228255 | A1 * | 9/2009 | Levin | G01V 1/301 |
| | | | | 703/6 |
| 2012/0008461 | A1 * | 1/2012 | Guigne | G01V 1/003 |
| | | | | 367/56 |
| 2013/0170317 | A1 | 7/2013 | Stork | |
| 2014/0200815 | A1 * | 7/2014 | Hung | G01V 1/34 |
| | | | | 702/16 |
| 2016/0109592 | A1 | 4/2016 | Sun et al. | |
| 2016/0202213 | A1 | 7/2016 | Volker et al. | |
| 2016/0252616 | A1 | 9/2016 | Wilby | |
| 2016/0320505 | A1 | 11/2016 | D'Afonseca et al. | |
| 2017/0199289 | A1 * | 7/2017 | Peng | G01V 1/362 |
| 2018/0267189 | A1 | 9/2018 | Haacke et al. | |
| 2019/0011588 | A1 | 1/2019 | Ji et al. | |
| 2019/0107639 | A1 * | 4/2019 | Moldoveanu | G01V 1/3826 |
| 2021/0149066 | A1 * | 5/2021 | Wu | G01V 1/36 |

FOREIGN PATENT DOCUMENTS

| | | |
|---|---|---|
| CN | 107817253 A | 3/2018 |
| CN | 107817523 A | 3/2018 |
| EP | 2733508 A1 | 5/2014 |
| GB | 1316497 | 5/1969 |
| JP | 1975-036401 A | 11/1975 |
| JP | 5036401 | 11/1975 |
| JP | 55121172 | 9/1980 |
| JP | 5633258 | 4/1981 |
| JP | 2000-338255 | 12/2000 |
| JP | 2004-184268 | 7/2004 |
| JP | 2004-279064 A | 10/2004 |
| JP | 03195994 | 2/2015 |
| JP | 2012-122758 A | 3/2015 |
| KR | 10-1864307 | 6/2018 |
| WO | 03104842 A1 | 12/2003 |
| WO | 20030104842 A1 | 12/2003 |

OTHER PUBLICATIONS

Yen, Application of synthetic-aperture processing to towed-array data, J. Acoust. Soc. Am. 86, 754-765 (1989) (Year: 1989).*

Schleicher, Controlling amplitudes in 2.5D common-shot migration to zero offset, Geophysics, vol. 69, No. 5 (Sep.-Oct. 2004) (Year: 2004).*

Ru-Shan Wu et al.: "Introduction: Seismic Wave Scattering in Three-dimensionally Heterogeneous Earth" in: Scattering and Attenuations of Seismic Waves, Part I, Pageoph, vol. 128, Nos. 1/2 (1988), Birkhäuser, Basel, pp. 1-6.

I. Sturzu et al.: "Diffraction imaging using specularity gathers", Journal of Seismic Exploration, 23: pp. 1-18 (2014).

Reeshidev Bansal et al.: "Diffraction enhancement in prestack seismic data", Geophysics, vol. 70, No. May-Jun. 2005, pp. 739-746.

Alex Berkovic et al.: "Diffraction imaging by multifousing", Geophysics, Society of Exploration Geophysicists, US, vol. 74, No. Suppl. of 6, Nov. 1, 2009, pp. WCA75-WCA81.

Ernest R. Kanasewich et al.: "Imaging discontinuities on seismic sections", Geophysics, vol. 53, No. 3, Mar. 1988, pp. 334-345.

Evgeny Landa et al.: "Seismic monitoring on diffraction Images for detection of local heterogeneities", Geophysics, vol. 63, No. 3, May-Jun. 1998, pp. 1093-1100.

T.J. Moser et al.: "Diffraction imaging in depth", Geophysical Prospecting, 2008, vol. 56, pp. 627-641, https://doi.org/10.1111/j.1365-2478.2007.00718.x.

R.S. Wu et al.: "Elastic Wave Scattering by a Random Medium and the Small-Scale Inhomogeneities in the Lithosphere", Journal of Geophysical Research, vol. 90, No. B12, Oct. 10, 1985, pp. 10261-10273.

Öz Yilmaz: "Seismic data processing", Society of Exploration Geophysicists, Tulsa, Oklahoma, USA, 1987, pp. 463-520 and 1001-1195.

Bangs. Nathan L.B. et al.: "The mechanics of intermittent methane venting at South Hydrate Ridge inferred from 4D seismic surveying", Earth and Planetary Science Letters 310, 2011, 105-112.

Belkacem, Afif et al.: "Planar SAS for Sea Bottom and Subbottom Imaging: Concept Validation in Tank", IEEE Journal of Oceanic Engineering vol. 31, No. 3, Jul. 2006, pp. 614-627.

Brissette, M.B., "Mine Detection Using Swath Bathymetric Sonars: Tools and Techniques", Mosaic Hydrographic Services (Canada) Ltd. (2006).

Dinn, Gary: "Field experience with a new sub-bottom investigation tool: Acoustic 3-D imaging of the sub-seabed", 2012 Oceans. Presented at the 2012 Oceans, pp. 1-9.

Guigné, Jacques Yves: "Acoustic Interrogations of Complex Seabeds" (Thesis, Doctor of Science)University of Bath, Bath, UK, Mar. 2013.

Guigné, Jacques Yves et al.: "Acoustic zoom high-resolution seismic beamforming for imaging specular and non-specular energy of deep oil and gas bearing geological formations", Journal of Natural Gas Science and Engineering 21, 2014, pp. 568-591.

Gutowski, Martin et al.: "3D high-resolution acoustic imaging of the sub-seabed", Applied Acoustics 69, 2008, pp. 262-271.

Guyonic, Stéphane et al.: "Buried mines detection and classification: 2D-SAS processing definition and experimental results", Oceans '02 MTS/IEEE. Presented at the Oceans '02 MTS/IEEE, 2002, pp. 468-473 vol. 1.

Hayes, Michael P. et al.: "Synthetic Aperture Sonar: A Review of Current Status", IEEE Journal of Oceanic Engineering, vol. 34, No. 3, Jul. 2009m, pp. 207-224.

Hodges, R.P.: "Underwater Acoustics: Analysis, Design, and Performance of Sonar", John Wiley & Sons, 2010, Chapter 3, pp. 23-62.

Karimpouli, Sadegh et al.: "Automated diffraction delineation using an apex-shifted Radon transform", 2015, J. Geophys. Eng. 12, 199-209.

Kanasewich, Ernest R. et al.: "Imaging discontinuities on seismic sections", Geophysics, vol. 53, No. 3, Mar. 1988, p. 34-345.

Moser, T.J. et al.: "Diffraction imaging in depth", Geophysical Prospecting, 2008, 56, pp. 627-641.

Berkovich, Alex et al:: "Diffraction imaging by multifocusing",

(56)          References Cited

OTHER PUBLICATIONS

Geophysics, vol. 74, No. 6, Nov.-Dec. 2009, p. WCA75-WCA81.

Papenmeier, Svenja et al.: "Detection of Stones in Marine Habitats Combining Simultaneous Hydroacoustic Surveys", Geosciences 2018, 8, 279, pp. 1-14.

Plets, R.M.K. et al.: "3D reconstruction of a shallow archaeological site from high-resolution acoustic imagery: The Grace Dieu", Applied Acoustics, The detection of buried marine targets, 69, 2018, available online Jun. 8, 2017, pp. 399-411.

Plets, Ruth M.K. et al.: "The use of a high-resolution 3D Chirp sub-bottom profiler for the reconstruction of the shallow water archaeological site of the Grace Dieu (1439), River Hamble, UK", Journal of Archaeological Science 36, 2009, pp. 408-418.

Wu, R.S. et al.: "Elastic Wave Scattering by a Random Medium and the Small-Scale Inhomogeneities in the Lithosphere", Journal of Geophysical Research, vol. 90, No. B12, pp. 10,261-10,273, Oct. 10, 1985.

Richards, Adrian F.: "Review of continental shelf marine geotechnics: Distribution of soils, measurement of properties, and environmental hazards", Marine Geotechnology, 1:1, 1975, pp. 33-67.

Tinkle, M.D. et al.: "Synthetic aperture sonar point response for buried objects", MTS/IEEE Oceans 2001. An Ocean Odyssey. Conference Proceedings (IEEE Cat. No. 01CH37295). Presented at the MTS/IEEE Oceans 2001, , vol. 1, pp. 225-233.

Vardy, Mark E. et al.: "Decimeter-resolution 3D seismic vol. in shallow water: A case study in small-object detection", Geophysics, vol. 73, No. 2, Mar.-Apr. 2008, pp. B33-B40.

Vardy, Mark E. et al.: "Multidisciplinary investigation of a shallow near-shore landslide, Finneidfjord, Norway", Near Surface Geophysics, 2012, 10.

Yasseri, Sirous: "Drilling Risk Identification, Filtering, Ranking and Management," 6th International Offshore Industries Conference, May 4 and 5, 2015, Teheran Sharif University of Technology.

Yilmaz, Özdogan, "Seismic Data Analysis," Soc. of Exploration Geophysicists (1987), vol. I, Chapter 4-4.2, pp. 463-520.

Zakharia, Manell E.: "Combined parametric synthetic and interferometric sonar for the detection of buried objects", Europe Oceans 2005. Presented at the Europe Oceans 2005, pp. 522-526 vol. 1.

Clarke, John E. Hughes, "Data Handling Methods and Target Detectgion Results for Multibeam and Sidescan Data Collected as Part of the Search for SwissAir Flight 111," Shallow Water Survey Conference (SWS) 204 (1999) [https://scholars.unh.edu/ccom/204].

Gardline, "UXO Surveys," Gardline (Sep. 8, 2018) http://www.gardline.com:80/activities/service/uxo-surveys/ [https://web.archive.org/web/20180908181046/http://www.gardline.com:80/activities/service/uxo-surveys/].

Gardline, "2D Seismic Geophysics," Gardline (Sep. 13, 2019) http://www.gardline.com/activities/service/2d-seismic-geophysics/ [https://web.archive.org/web/20190913151711/http://www.gardline.com/activities/service/2d-seismic-geophysics/].

Gardline, "High Resoution 3D Seismic," Gardline Jan. 19, 2019) http://www.gardline.com/activities/service/high-resolution-3d-seismic/ [https://web.archive.org/web/20190119041139/http://www.gardline.com/activities/service/high-resolution-3d-seismic].

Teledyne Reson, "ParaSound Deep-Sea Parametric Sub-Bottom Profiler," Teledyne RESON (2018), http://www.teledynemarine.com/parasound-sub-bottom-profilers.

Kongsberg, "Sub Bottom Profiler—SBP 120/300," Kongsberg Gruppen ASA (Mar. 15, 2017) http://www.km.kongsberg.com/ks/web/nokbg0240.nsf/AllWeb/EF54BDEF668D0CABC1256CAE00303701?OpenDocument [https://web.archive.org/web/20150823024656/http://www.km.kongsberg.com/ks/web/nokbg0240.nsf/AllWeb/EF54BDEF668D0CABC1256CAE00303701?OpenDocument].

Backwell, George, "Kongsberg Deliver GeoChirp 3D Subsea Proviler to China," Marine Technology News (May 6, 2014), https://www.marinetechnologynews.com/news/kongsberg-deliver-geochirp-subsea-491519.

DEA, "Seismics," DEA Deutsche Erdoel AG (Apr. 22, 2019) http://www.dea-group.com/en/technology/exploration/seismik [https://web.archive.org/web/20180422054640/http://www.dea-group.com/en/technology/exploration/seismik].

NCS Subsea PCable, "NCS SubSea PCable", NCS P-Cable 3D Seismic AS (Jan. 24, 2019), http://pcable.com/default.dmx [https://web.archive.org/web/20190124032842/http://pcable.com/default.dmx].

PGS, "Towed Streamer Seismic," PGS Geophysical AS, (Dec. 30, 2018) https://www.pgs.com/marine-acquisition/services/towed-streamer-seismic/ [https://web.archive.org/web/20181230171644/https://www.pgs.com/marine-acquisition/services/towed-streamer-seismic/].

Pangeo Subsea, "Sub-Bottom Imager," PanGeo Subsea Inc. (Mar. 12, 2018), https://www.pangeosubsea.com/sub-bottom-imager/ [https://web.archive.org/web/20180312163953/https://www.pangeosubsea.com/sub-bottom-imager/].

Pangeo Subsea, "Acoustic Corer," PanGeo Subsea Inc. (Mar. 25, 2019), https://www.pangeosubsea.com/acoustic-corer/ [https://web.archive.org/web/20190325202346/https://www.pangeosubsea.com/acoustic-corer/].

Fugro, "Geowing," Fugro N.V. (Apr. 13, 2017), https://www.fugro.com/about-fugro/our-expertise/innovations/geowing [https://web.archive.org/web/20170413113145/https://www.fugro.com/about-fugro/our-expertise/innovations/geowing].

Marum, "Free-Fall Probes," Universitat Bremen https://www.marum.de/en/about-us/Marine-Geotechnics.html (last visited Aug. 8, 2021).

International Association of Oil and Gas Producers; "OGP Guidelines for the Conduct of Offshore Drilling Hazard Site Surveys," OGP Report No. 272-18-1 (Apr. 2011) [http://www.ieco.org/Documents/OGP%20Site%20Survey%20Guidelines.pdf].

Landa, Evgeny et al., Seismic Monitoring of Diffraction Images for Detection of Local Heterogeneties, 63 Geophysics 1093 (May 1998) [https://doi.org/10.1190/1.1444387].

Sturzu, I. et al., Diffraction Imaging Using Specularity Gathers, Journal of Seismic Exploration 23, 1-18 (May 30, 2013).

Aki, Keiiti et al., "Scattering and Attenuations of Seismic Waves," 128 Pure and Applied Geophysics (1998).

Bansal, Reeshidev et al.: "Diffraction enhancement in prestack seismic data", Geophysics, vol. 70, No. 3, May-Jun. 2005, p. V73-V79.

Yilmaz, Özdogan, "Seismic Data Analysis," Soc. of Exploration Geophysicists (1987), vol. I, Chapter 7.2, pp. 1030-1072.

* cited by examiner

OBTAIN A RECEIVER SIGNAL — 110

GROUP PORTIONS OF THE RECEIVER SIGNAL — 120

PERFORM A TRAVEL TIME CORRECTION — 130

COMBINE THE TRAVEL TIME CORRECTED PORTIONS — 140

DETECT ONE OR MORE OBJECTS — 190

RECEIVER SIGNAL

INTERFACE — 12

PROCESSING MODULE — 14

DETECTION OF OBJECTS

10

METHOD, APPARATUS, AND COMPUTER PROGRAM FOR DETECTING ONE OR MORE OBJECTS IN THE SEA FLOOR

CROSS-REFERENCE TO RELATED APPLICATIONS

This application is a 35 U.S.C. § 371 (c) national stage entry of PCT/EP2020/067864, filed on Jun. 25, 2020. That application claimed priority to German Application 10 2019 117 587.9 filed on Jun. 28, 2019. The contents of the earlier filed applications are incorporated by reference herein in their entirety.

TECHNICAL FIELD

Embodiments relate to a method, a computer program, as well as an apparatus for detecting one or more objects in the sea floor, more specifically, but not exclusively, to detecting objects based on a scattering of an acoustic signal at the one or more objects.

BACKGROUND

The localization of objects of various sizes in marine sediments is in many cases a prerequisite for the construction of marine infrastructure as well as for the economic use of the sea floor, e.g., wind turbines, pipelines, platforms, cable routes, drilling. Such objects may be glacial erratics or other geological inhomogeneities, but also non-detonated explosive devices (UneXploded Ordnance: UXO) that lie in the uppermost sediment layers. Glacial erratics, for example, pose a problem in the Quaternary deposits of the North and Baltic Seas and generally in many shallow sea areas of temperate and higher latitudes for the installation of offshore infrastructure (infrastructure built on the sea floor away from the coast), while UXO, for example, are found in the North and Baltic Seas and may require extensive detection and clearance prior to the construction of offshore infrastructure. Conventional methods for subsurface exploration like 2D/3D reflection seismology, high resolution acoustics as well as magnetics show different limitations for object detection in sediments.

The localization of objects in marine sediments is a task in the development of offshore infrastructure as well as for drilling or for the foundation of, for example, platforms or wind energy turbines that may often only be solved insufficiently using conventional methods.

SUMMARY

The present invention relates to a detection of one or more objects in the sea floor, enabled by a processing of data from a receiver signal mapping a scattering (diffraction) of multiple acoustic signals at the one or more objects.

The invention is based on using the scattering of the multiple acoustic signals at one or more objects to detect the one or more objects. In order to be able to evaluate the scattering, the present disclosure assigns portions of the receiver signal originating from different receivers and/or from different time points to points of a detection grid. Since these portions originate from multiple receivers and/or from multiple time points, a travel time correction is adjusted for these portions, for example to compensate for an offset between the receivers and between the receivers and the source. Subsequently, the travel time corrected portions are combined ("stacked") to a common signal, which may be used to determine whether there is an object at a certain depth (of a point of the detection grid) that may be detected by means of the diffractions.

Embodiments create a method for detecting one or more objects in the sea floor. The method comprises obtaining a receiver signal. The receiver signal is based on a scattering of multiple acoustic signals at the one or more objects in the sea floor. The receiver signal is generated by a plurality of receivers. The method further comprises grouping portions of the receiver signal to points of a detection grid. The detection grid represents a grid at the points of which the one or more objects are being localized. The method further comprises performing a travel time correction of the portions of the receiver signal with respect to the points of the detection grid. The method further comprises combining the travel time corrected portions of the receiver signal at the points of the detection grid. The method further comprises detecting the one or more objects at the points of the detection grid based on the combination of the travel time corrected portions of the receiver signal. The detection of the one or more objects is based on the scattering of the multiple acoustic signals at the one or more objects.

By grouping the portions of the receiver signal to points of a detection grid, performing a travel time correction, and subsequently combining the portions, a detection of the one or more objects based on the scattering of the acoustic signal picked up by a large receiver array is enabled or enhanced.

For instance, a wavelength of the multiple acoustic signals may be matched to an expected size of the one or more objects. This makes it possible to perceive a scattering of the acoustic signal at the one or more objects. For example, a distance between adjacent receivers of the plurality of receivers may be at most half the wavelength of the multiple acoustic signals. This avoids aliasing in the detection of the one or more objects.

For example, the one or more objects may be detected based on an amplitude of the combination of the travel time corrected portions of the receiver signal. For example, the amplitude may be a possibility which is easy to evaluate and to visualize in order to recognize the presence of an object at a point of the detection grid.

In some embodiments, the method further comprises calculating an envelope of the amplitude of the combination of the travel time corrected portions of the receiver signal. The one or more objects may be detected based on the envelope. This allows an improved illustration and interpretation of the detection.

The method may further comprise calculating a coherence function based on the combination of the travel time corrected portions of the receiver signal. The coherence function may be based on a similarity between temporally successive portions of the receiver signal. The one or more objects may be detected based on the coherence function. The coherence function may, for example, map how similar adjacent values are in the combination of the travel time corrected portions of the receiver signal, for example in order to give less weight to such values which represent "outliers" in a subsequent step, i.e., outliers in the combination of the travel time corrected portions of the receiver signal may be suppressed by the coherence function.

In some embodiments, the method comprises calculating a weighted envelope based on the envelope and based on the coherence function. The weighted envelope offers improved interpretability and informative value than the combination of the travel time corrected portions of the receiver signal.

For example, the coherence function may be based on a semblance analysis. Semblance analyses allow to improve the resolution of seismic data even though background noise is present in the receiver signal.

The method may further comprise adjusting the combination of the travel time corrected portions of the receiver signal to achieve a signal amplification of signal portions based on the scattering of the multiple acoustic signals at more distant objects of the one or more objects. This allows a relative approximation of the amplitude of diffractions occurring further away from the receivers.

In some embodiments, the method further comprises identifying a reflection of the scattering of the acoustic signal at the one or more objects. The reflection of the scattering of the acoustic signal at the one or more objects may be disregarded in the detection of the one or more objects. For example, echoes of the diffractions on other objects may be filtered out.

In some embodiments, a constant seismic velocity may be assumed for the travel time correction. This enables a simplified calculation of the travel time correction, with a possibly reduced accuracy.

In some embodiments, the travel time correction may be performed for a range of possible seismic velocities (so-called Radon transform). A seismic velocity from the range of possible seismic velocities may be selected for the travel time correction based on a magnitude of a local maximum in the corresponding combination of the travel time corrected portions of the receiver signal. The magnitude of the local maximum may be used as an indicator that the selected average velocity is sufficiently accurate.

Alternatively, seismic velocities matched to different material layers between the plurality of receivers and the points of the detection grid may be used for the travel time correction with respect to the points of the detection grid. This allows the seismic velocities on which the travel time correction is based to be defined as precisely as possible.

In at least some embodiments, the portions of the receiver signal are grouped to the points of the detection grid based on a distance of the points of the detection grid from the receivers of the plurality of receivers and from at least one signal source of the acoustic signal. This may be used, for example, as a basis for determining which portions of the receiver signal are considered for which point on the detection grid.

For example, the portions of the receiver signal for each acoustic signal may be grouped separately to the points of the detection grid (so-called Real Aperture Processing).

Alternatively, the portions of the receiver signal may be grouped to the points of the detection grid for a predefined number of time points combined in the predefined time sequence (so-called Synthetic Aperture Processing). This allows the resolution to be increased in the direction of movement.

In some embodiments, the portions of the receiver signal may be grouped to the points of the detection grid for a predefined distance of the points of the detection grid from the receivers of the plurality of receivers and from the at least one signal source. This allows processing of the portions of the receiver signal likely to be relevant to a point of the detection grid.

In at least some embodiments, the receiver signal comprises a first signal portion based on the scattering of the multiple acoustic signals at the one or more objects. The receiver signal may further comprise a second signal portion based on a reflection of the multiple acoustic signals. The method may comprise suppressing the second signal portion relative to the first signal portion. Grouping the portions of the receiver signal, performing the travel time correction, combining the travel time corrected portions, and/or detecting the one or more objects may be based (exclusively or by far predominantly) on the first signal portion. This allows suppressing or removing the reflection of the acoustic signals from the receiver signal to facilitate or improve the detection of the one or more objects on the basis of the diffraction. In other words, the method may comprise suppressing, in the receiver signal, a reflection of the multiple acoustic signals.

In some embodiments, suppressing the second signal portion, i.e., the reflection of the multiple acoustic signals, is based on an eigenvalue decomposition of a travel time corrected version of the receiver signal. This enables efficient suppression of the second signal portion.

In embodiments, the at least one signal source and the plurality of receivers are intended to be towed by a vessel along a water surface above the sea floor. The detection grid may, for example, be a two-dimensional detection grid. The two-dimensional detection grid may be spanned along a direction of travel of the vessel and along a depth axis between the at least one signal source and/or the plurality of receivers and the sea floor. This enables a systematic detection of objects in the sea floor.

Embodiments further create a program having a program code for performing the method when the program code is executed on a computer, a processor, a control module, or a programmable hardware component.

Embodiments further create an apparatus for detecting one or more objects in the sea floor. The apparatus includes an interface for obtaining a receiver signal. The receiver signal is based on a scattering of multiple acoustic signals at the one or more objects in the sea floor. The receiver signal is generated by a plurality of receivers. The apparatus further comprises a processing module configured to group portions of the receiver signal to points of a detection grid. The detection grid represents a grid at the points of which the one or more objects are being localized. The processing module is further configured to perform a travel time correction of the portions of the receiver signal with respect to the points of the detection grid. The processing module is further configured to combine the travel time corrected portions of the receiver signal at the points of the detection grid. The processing module is further configured to detect the one or more objects at the points of the detection grid based on the combination of the travel time corrected portions of the receiver signal. The detection of the one or more objects is based on the scattering of the multiple acoustic signals at the one or more objects.

BRIEF DESCRIPTION OF THE FIGURES

Some examples of apparatuses and/or methods will be described in the following by way of example only and with reference to the accompanying figures, in which.

DESCRIPTION

Figure 1A:
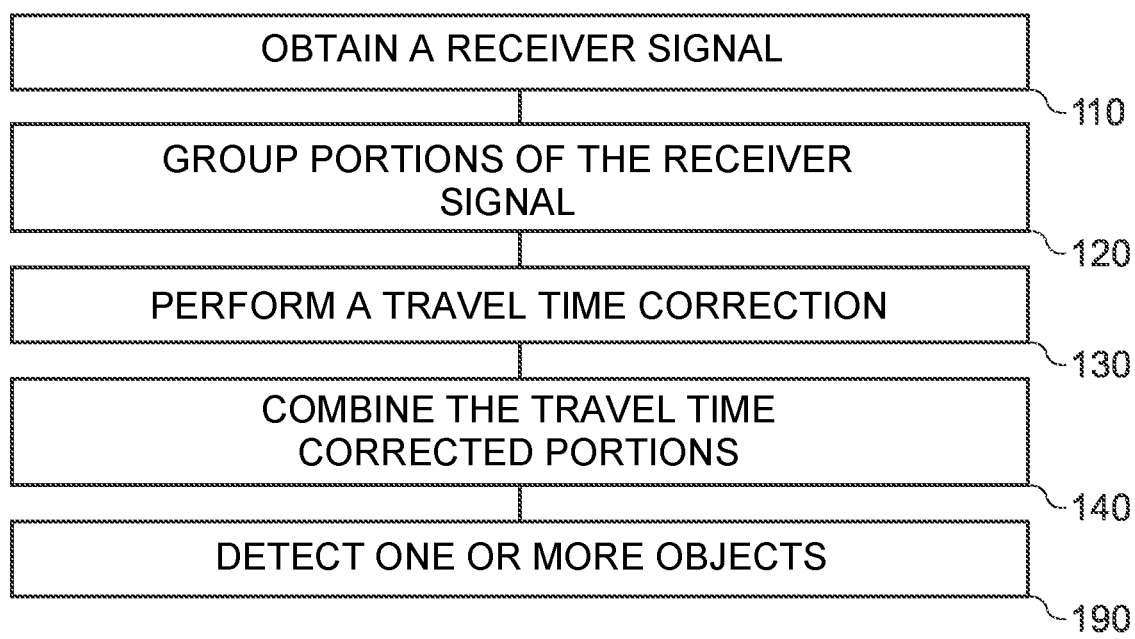
FIGS. 1a and 1b show flowcharts of embodiments of a method for detecting one or more objects in the sea floor.

Various examples will now be described in more detail with reference to the accompanying Figures in which some examples are illustrated. In the Figures, the thicknesses of lines, layers and/or areas may be exaggerated for clarity.

Accordingly, while further examples are capable of various modifications and alternative forms, some particular examples thereof are shown in the Figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e., only A, only B as well as A and B, unless explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. If a function is described below as being implemented using multiple elements, further examples may implement the same function using a single element or a single processing entity. It will be further understood that the terms "comprises", "comprising", "includes" and/or "including," when used, specify the presence of the stated features, integers, steps, operations, processes, elements, components and/or any group of the same, but do not preclude the presence or addition of one or more other features, integers, steps, operations, processes, elements, components and/or any group thereof.

Unless otherwise defined, all terms (including technical and scientific terms) are used herein in their ordinary meaning of the art to which the examples belong.

At least some embodiments of the present disclosure deal with object subsurface characterization using point diffractor processing. For example, an arrangement in which the acoustic source and the receivers are decoupled may be used for subsurface characterization. Embodiments include processing seismic/acoustic data for the purpose of detecting point diffractors in marine sediments. The data processing is represented as a sequence of data processing steps. These steps are optimized for seismic/acoustic data that have special recording geometry requirements, i.e., data that meet the prerequisite for processing by the steps shown herein. The data processing described is optimized for application to data acquired with a specialized acquisition unit, but the processing steps may also be applied to other acoustic/seismic data. The terms seismic data and acoustic data are to be understood as synonymous for this application, since the frequency content of the data lies above the generally assumed borderline range between seismics and acoustics (approx. 100-1000 Hz). However, the described principle of data processing may also be performed with seismic/acoustic data that lie outside this frequency range.

A prerequisite for at least some embodiments of the present concept is the recording of a wave field as time series (in a receiver signal), wherein the positions of the recording units and the signal sources are known, and the source and recording are synchronized in time. The steps described in more detail later lead to a subsurface model resulting from a statistical evaluation of track groups. The result of the data processing is a seismic/acoustic data volume of the survey area in which point diffractors at their respective spatial positions may be distinguished from the environment by their amplitude, i.e., signal strength. This data volume subsequently enables the mapping of point diffractors in the survey area.

Although diffracted waves carry important information, there are only few established techniques in the field of exploration geophysics that make this portion of a seismic wave field usable for examining the subsurface (Landa and Keydar, 1998: "Seismic monitoring of diffraction images for detection of local heterogeneities."; Moser and Howard, 2008: "Diffraction imaging in depth"). The starting point for such diffractions may be glacial erratics or other geological inhomogeneities, but also non-detonated explosive devices (UneXploded Ordnance: UXO) that lie in the uppermost sediment layers. These objects and/or inhomogeneities produce point diffractions, i.e., spherically scatter the wave field as a secondary source, if they are both different from the surroundings by their physical properties and have a suitable size (Wu and Aki, 1985: "Elastic wave scattering by a random medium and the small-scale inhomogeneities in the lithosphere", 1988: "Introduction: Seismic Wave Scattering in Three-dimensionally Heterogeneous Earth, in: Scattering and Attenuations of Seismic Waves, Part I"). The most important physical properties are usually the density and the propagation velocity of seismic waves within the object and/or in the surrounding subsurface. A suitable object size exists if the wavelength of the seismic wave excites the object to radial resonance. For this, the radius of the object may be in a size range from ~20% to ~200% of the wavelength. Based on a highly accurate recorded wave field with acquisition parameters matched to the objects to be mapped, the disclosure described herein may map and characterize objects and inhomogeneities of various sizes in marine sediments.

In general, there are a number of methods for localizing objects under the sea floor, each with specific advantages and disadvantages. In summary, all seismic/acoustic methods established to date either lack the spatial resolution to map objects (0.5-5 m) reliably or show too little signal penetration into the sediments. Magnetic methods for UXO detection show low reliability and high susceptibility to false detections. To avoid duplication, only alternative data processing options for seismic/acoustic data for object detection are shown below.

In general, two approaches may be distinguished for mapping point diffractions on the basis of seismic/acoustic data: Either filters are applied during the migration of the data, or a portion of the wave field is extracted from the raw dataset (Moser and Howard, 2008; Sturzu et al. 2014: "Diffraction imaging using specularity gathers"). Migration algorithms are a possible method for mapping diffractions. The step in seismic data analysis that shifts tilted reflectors to their true position in the subsurface and projects diffractions back to their origin is called migration (Yilmaz, 1991: "Seismic data processing. Society of Exploration Geophysicists"). This step is used to generate a replica of the subsurface from an image of the wave field. In order to map diffractions with migration filters, the principle may be used that reflections may be locally approximated as flat surfaces after a standard migration. Through this approximation, a filter may then be determined to suppress reflections, and in a second migration pass, only diffractions at their point of origin are mapped after applying the filter (Sturzu et al., 2014). In this context, the opening angle of migration and the underlying velocity model are often important factors. In addition, real-time processing is usually not possible with migration algorithms, since the complete data set must always be available in order to perform a migration. In addition, migration algorithms require a relatively high computational effort depending on the exact methodology used.

To extract diffractions from the wave field, a number of data processing steps are usually combined. Since diffractions are much weaker than reflections, the techniques usually aim at a targeted suppression of reflections so that after this suppression, only diffractions and noise remain in the data sets. The reflection suppression is usually not perfect, so that attenuated reflections partly still remain in the data.

Another aspect of mapping diffractions is the sorting of the data. The goal of sorting is to bundle all time series that contain a certain diffraction and have been recorded at the receivers into one group. In the case of reflection seismics, the tracks whose center points between the transmitter and receiver are close to each other are bundled. This center point may be assumed to be the reflection point as an approximation. Often this type of sorting is also used for mapping diffractions. However, this approach makes little sense from a statistical point of view. Since a diffraction represents a new, secondary source, in at least some embodiments, all time series that are within a certain distance from the diffraction origin may be bundled. This distance is determined, for example, by whether the seismic source illuminates the point, the signal-to-noise ratio is high enough despite attenuation of the signal with increasing distance, and the recording time of the receiver is sufficient. A track may contain multiple diffractions and may thus be assigned to different groups.

The approach described herein is based on the fact that certain objects in the subsurface backscatter seismic waves, for example in the form of spherical waves. If the seismic waves are generated and recorded in a controlled manner, locations where these objects may be found may be determined in an exploratory method by means of travel time corrections and statistical evaluations.

Figure 1C:
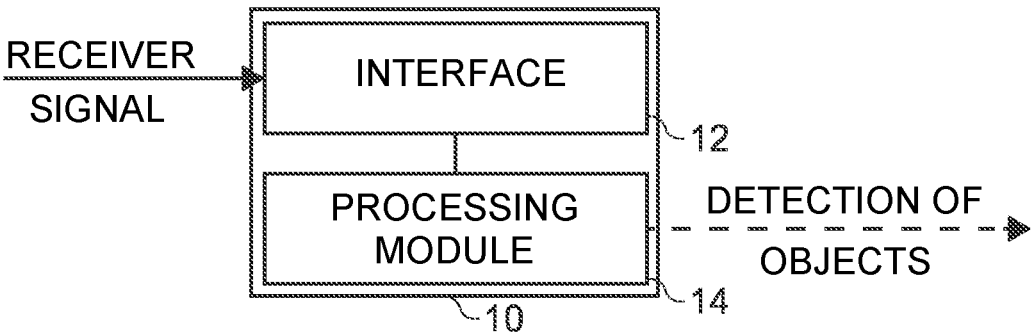
FIG. 1c shows a block diagram of an embodiment of an apparatus for detecting one or more objects in the sea floor.
Figure 1B:
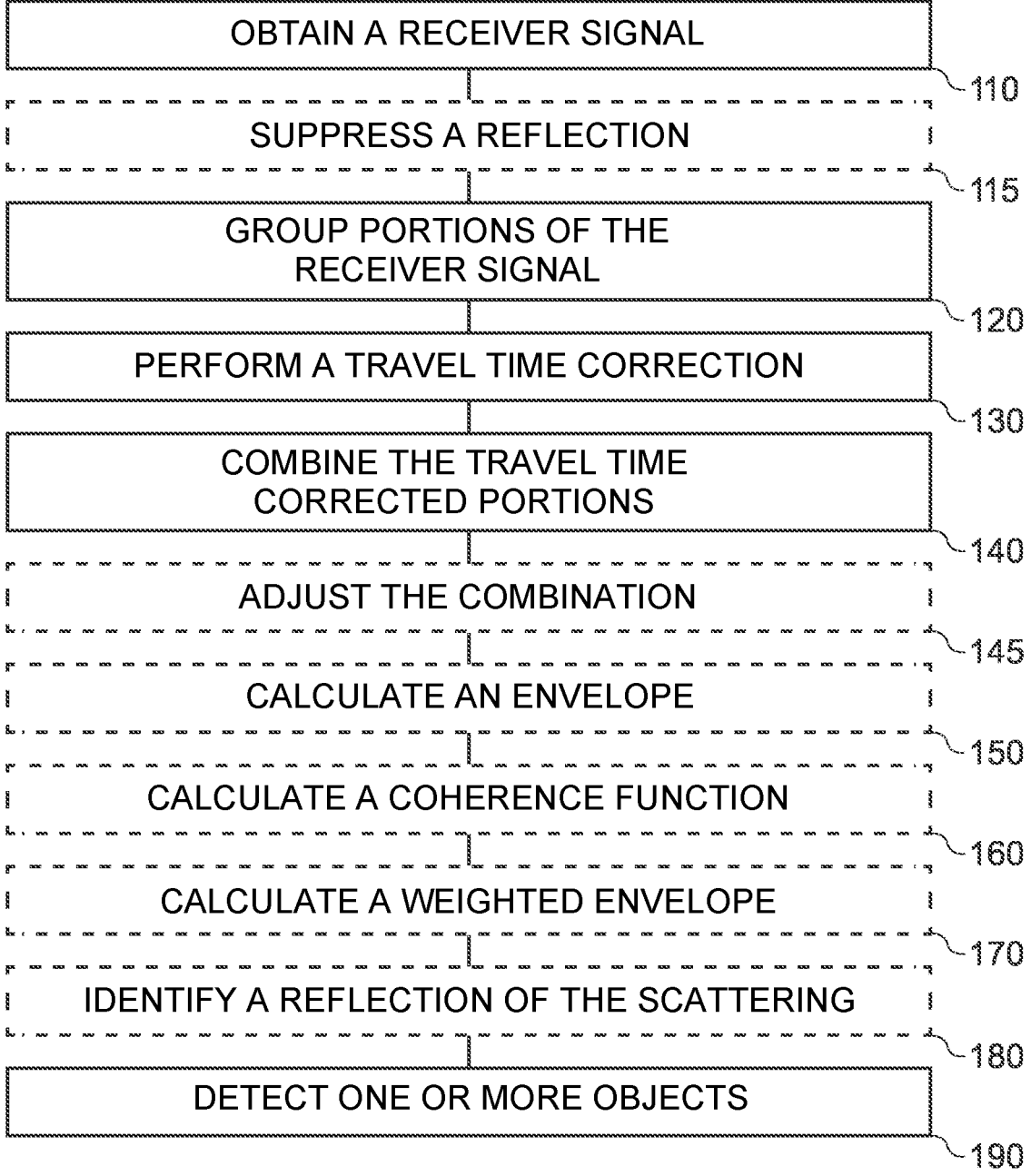

FIGS. 1a and 1b show flowcharts of embodiments of a method for detecting one or more objects in the sea floor. The method comprises obtaining 110 a receiver signal. The receiver signal is based on a scattering of multiple acoustic signals at the one or more objects in the sea floor. The receiver signal is generated by a plurality of receivers. The method further comprises grouping 120 portions of the receiver signal to points of a detection grid. The detection grid represents a grid at the points of which the one or more objects are being localized. The method further comprises performing 130 a travel time correction of the portions of the receiver signal with respect to the points of the detection grid. The method further comprises combining 140 the travel time corrected portions of the receiver signal at the points of the detection grid. The method further comprises detecting 190 the one or more objects at the points of the detection grid based on the combination of the travel time corrected portions of the receiver signal. The detection of the one or more objects is based on the scattering of the multiple acoustic signals at the one or more objects.

FIG. 1c shows a block diagram of an embodiment of a corresponding apparatus 10 for detecting one or more objects in the sea floor. The apparatus 10 includes an interface 12 for obtaining a receiver signal. The apparatus 10 further comprises a processing module 14 which is coupled to the interface 12. The processing module is configured to perform the method of FIGS. 1a and/or 1b. For example, the processing module is configured to group the portions of the receiver signal to points of the detection grid. The processing module is further configured to perform the travel time correction of the portions of the receiver signal with respect to the points of the detection grid. The processing module is further configured to combine the travel time corrected portions of the receiver signal at the points of the detection grid. The processing module is further configured to detect the one or more objects at the points of the detection grid based on the combination of the travel time corrected portions of the receiver signal.

The following description refers to both the method of FIGS. 1a and/or 1b and to the corresponding apparatus 10 of FIG. 1c.

Embodiments of the present disclosure deal with a method, an apparatus as well as a computer program for detecting one or more objects in the sea floor. The term "sea floor" is not to be construed as limiting in the context of the present disclosure—embodiments are equally applicable to detecting objects in a riverbed or at the bottom of a lake or other body of water.

Accordingly, in the light of this application, the term 'sea floor' also includes the bottom of bodies of water in general, i.e., also 'riverbed', 'bottom of the lake' or 'lakebed'.

For example, the system is here intended to detect objects underneath the sea floor or riverbed, such as objects located, for example, in the sediment of the sea floor. For example, the system may be designed to detect the one or more objects within 10 m (or within 15 m, within 20 m) beneath the sea floor. For example, a detection depth of the system may protrude at least 10 m (or at least 15 m, at least 20 m) into the sea floor. The one or more objects may be, for example, (large, isolated) pieces of rock, such as glacial erratics, which are located in the sea floor. In other embodiments, the one or more objects may be, for example, ammunition that has not exploded, so-called UneXploded Ordnance (UXO). These objects may pose a risk, for example, if structures such as wind turbines or drilling platforms are to be built in the sea floor on foundations that protrude into the sea floor. To detect these objects, embodiments, unlike other approaches, do not use reflections caused by a signal source on the objects, but use the scattering of an acoustic signal at the respective objects. To take advantage of these scattering effects, the wavelength of the acoustic signal used for detection is matched to the size of the objects to be detected. To obtain wide-angle scattering on which the detection may be based, the wavelength of the acoustic signal may be of the same order of magnitude as the size of the objects themselves.

The method comprises obtaining 110 the receiver signal. In embodiments, the receiver signal is generated by a plurality of receivers. The receivers of the plurality of receivers may be, for example, hydrophones, which are microphones that may be used underwater to record or hear underwater sound. The plurality of receivers may be configured, for example, to capture a wavefront formed by scattering (and optionally reflection) of the multiple acoustic signals at the one or more objects (and optionally at the sea floor as well) and to generate the receiver signal based on the captured wavefront. Thus, the plurality of receivers is configured to generate the receiver signal based at least on a scattering of the multiple acoustic signals at the one or more objects.

Receivers often capture both the scattering and the reflection of the acoustic signal. In these cases, the portions based on the scattering and the portions based on the reflection may be separated by the processing module. In other words, the receiver signal may comprise a first signal portion based on the scattering of the multiple acoustic signals at the one or more objects. The receiver signal may comprise a second signal portion based on a reflection of the multiple acoustic signals. The method may comprise suppressing 115 the second signal portion relative to the first signal portion. The subsequent processing steps, such as grouping the portions of the receiver signal, performing the travel time correction, combining the travel time corrected portions, and/or detecting the one or more objects may be based (exclusively or predominantly) on the first signal portion, for example. In other words, the method may comprise suppressing 115, such as attenuating the received power by at least 50%, in the receiver signal, the reflection of the multiple acoustic signals (such as at the sea floor). Good results are obtained with a methodology based on singular value decomposition (SVD; see Bansal and Imhof, 2016: "Diffraction enhancement in prestack seismic data") after a travel time correction for reflections. After the eigenvalue decomposition, the travel time correction is calculated back so that the original tracks are restored without reflections. Other approaches to reflection suppression are conceivable and do not change the way forward. In other words, suppressing the second signal portion, or the reflections, may be based on an eigenvalue decomposition of a travel time corrected version of the receiver signal.

In some embodiments, it is advantageous for the exemplary solution path shown herein that the backscattered wave field is sampled sufficiently densely. Therefore, it is assumed in the following by way of example that the locations at which the seismic waves are artificially generated (shot locations) and recorded (receiver locations) are known very precisely in space. In addition, the time points of the generation of the waves may be synchronized with the start of each recording. For example, a wave field is sampled sufficiently densely if no aliasing occurs in space and time, i.e., if each wavelength is sampled at least twice in space and time.

In at least some embodiments, the wavelength of the acoustic signal is matched to an expected size of the one or more objects. For example, the expected size of the one or more objects may be a value specified by the target of the detection. If, for example, glacial erratics are to be found, a different wavelength may be used than in a case where ammunition is to be found or, for example, a sunken ship. Thus, the wavelength of the multiple acoustic (or seismic) signals may be in the same range as the expected size of the one or more objects themselves. The wavelength of the multiple acoustic signals may correspond to at least 10% (or at least 20%, at least 30%, at least 50%) of the expected size of the one or more objects. The wavelength of the acoustic signals may, for example, correspond to at most 1000% (or at most 800%, at most 500%) of the expected size of the one or more objects. The present system and method may be used in many cases to detect rather larger objects, such as glacial erratics or unexploded ordnance. For example, the wavelength of the multiple acoustic signals may be approximately at least 50 cm (or at least 80 cm, at least 100 cm, at least 150 cm). For example, the wavelengths of the multiple acoustic signals may be substantially the same, i.e., differ by less than 5% of the wavelength. Also the distance between adjacent receivers of the plurality of receivers may be made dependent on the wavelength, for example to avoid aliasing. For example, a distance between adjacent receivers of the plurality of receivers may be at most half the wavelength of the multiple acoustic signals.

In an exploratory method, it may then be checked at all positions reached by the artificially generated seismic wave whether an object with the properties described above is located at this location. Limiting factors are the attenuation of the seismic signal with increasing travel time and the beam pattern of the objects. In order to test all possible locations of point diffractors in the survey area, a grid configuration (such as the detection grid) may be created in which the calculations are performed on the acoustic data. To follow the common conventions, the individual grid points (the points of the detection grid) are referred to as CFPs.

Figure 2:
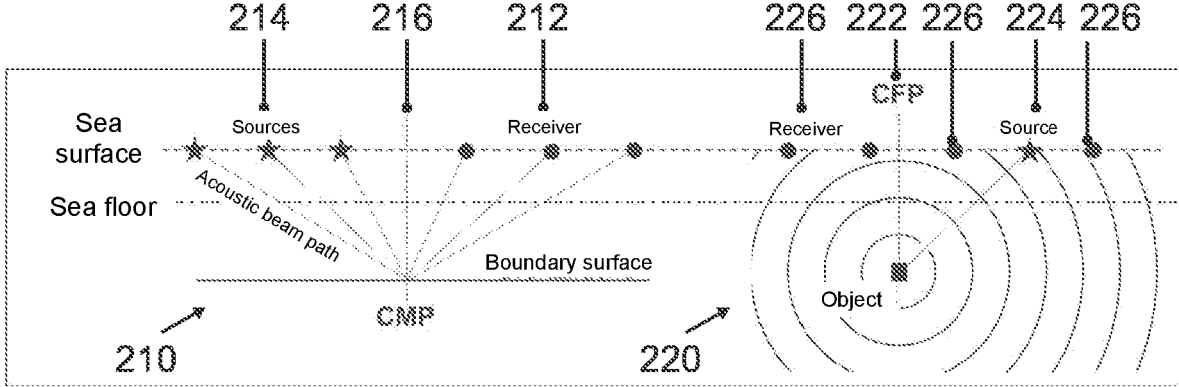
FIG. 2 shows a schematic diagram of a common-midpoint and common-fault-point sorting principle.

FIG. 2 shows a schematic diagram of a common-midpoint (CMP) and common-fault-point (CFP) sorting principle. While CMPs 210 combine time series of receivers 212 whose midpoints 216 coincide between source 214 and receiver 212, CFPs 220, in contrast, combine all time series that include a secondary spherical wave originating from a point diffraction source 222 (reference number 224 shows the acoustic source, reference number 226 shows the receivers).

In the next step, the CFPs are systematically checked. In this regard, the CFPs correspond to the points of the detection grid. The subsequent steps are performed for each point of the detection grid. For example, at each of the CFPs, at least a portion of the same sequence of steps is repeated as shown in FIGS. 3*a*-3*h* and described in detail below. In other words, steps 120-190 may be performed for each point of the detection grid. For example, grouping 120 the portions of the receiver signal, performing the travel time correction, combining the travel time corrected portions, and detecting the one or more objects (as well as the steps described below as optional) may be performed (separately) for each point of the detection grid. This approach makes the solution path an exploratory method. If there is an object at the tested location, a coherent signal is generated by a travel time correction of the acoustic recordings. With the help of this corrected and thus coherent signal, the one or more objects are detected. If there is no object at the location, no coherent signal is generated by the travel time correction and therefore no detection takes place.

The individual processing steps are explained below by means of schematic illustrations. FIGS. 3*a* to 3*h* show an illustration of the processing steps by means of synthetic data. The source-receiver offset describes the distance from the source to the receiver, while the distance to CFP describes the distance from a receiver to a Common Fault Point; Common Fault Points (i.e., the points of the detection grid) are potential positions of a source of scattering.

Figure 3:
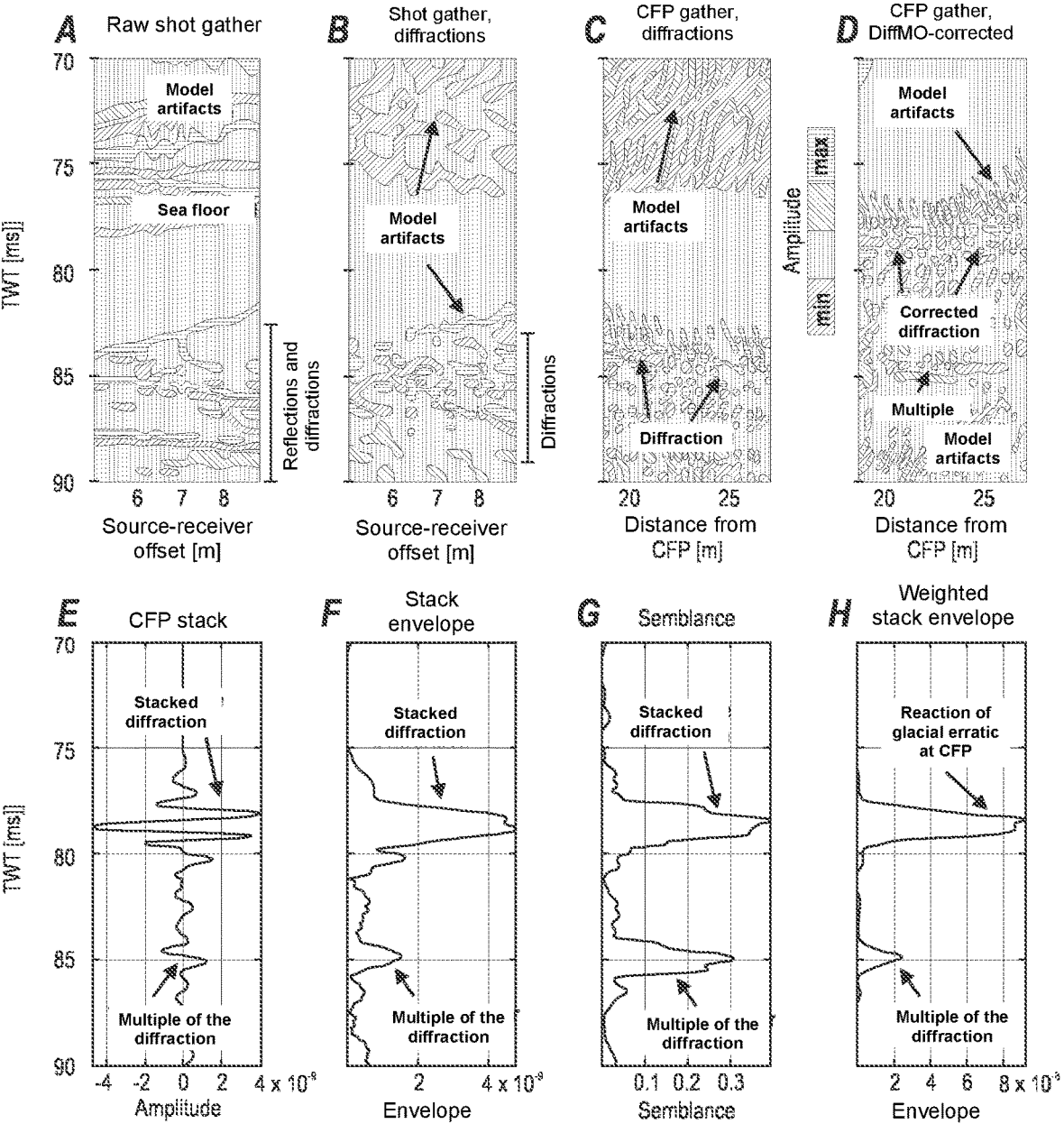
FIGS. 3a to 3h show an illustration of processing steps by means of synthetic data.

In the first illustration of the series, FIG. 3*a*, the receiver signal is illustrated, which includes, besides the diffractions, also reflections. FIG. 3*a* shows a synthetic example of raw shot gather in which reflections may be seen as hyperbolic branches. FIG. 3*a* shows model artifacts 302, reflections caused by the sea floor 304, and another group of reflections and diffractions 306. Normally, reflections, such as the reflection of the sea floor marked as "sea floor" are most clearly visible in marine seismic datasets. In the raw data illustration of all recorded signals for a shot, reflections appear as hyperbolic branches. Diffractions are included in the data, but are difficult or impossible to see in this illustration because of their weak amplitude and the travel paths which are different from reflections. The x-axis of FIG. 3a and FIG. 3b shows the source-receiver offset (in m), while the TWT (Two-Way-Traveltime) is plotted in ms on the y-axis of FIGS. 3a to 3h.

FIG. 3b illustrates a relative signal amplification of the diffractions in the capturing of the acoustic signal ("shot gather"). This signal amplification may be achieved, for example, by suppressing 115 the reflections in the receiver signal. The aim of this step is to amplify the diffractions that are weak compared to the reflections. For this purpose, the reflections are attenuated in a targeted manner, for example. This is possible because the travel time curves of diffractions and reflections are different. In FIG. 3b, due to an attenuation of reflections, the noise and especially the diffractions 312, which give a chaotic impression when plotted against the source-receiver offset, are better differentiable. As shown, even after suppression of the reflections, diffractions are still not clearly recognizable in the illustration of all recordings for a shot. In the case of strong diffractions, this step may also be skipped. Again, model artifacts 314 may be seen in FIG. 3b.

Subsequently, the portions of the receiver signal are assigned to the points of the detection grid. In the following, the points of the detection grid are also referred to as CFPs (Common-Fault-Points). FIG. 3c illustrates a sorting of the existing seismic data (the portions of the receiver signal) into Common Fault Points (the grouping of the portions of the receiver signal to the points of the detection grid), as performed for example by Kanasewich and Phadke, 1988 in "Imaging discontinuities on seismic sections". In the illustration of the signals against the distance of the receivers from a CFP (x-axis, also in FIG. 3d) in FIG. 3c, diffractions 322 may now be seen as hyperbolic branches. Model artifacts 324 may also be seen in FIG. 3c. FIG. 3c shows the diffractions in the CFP capturing ("CFP gather").

For example, to enable a statistical evaluation and to allow a better illustration, all shots and receivers that would contain the diffraction of an object at that location are combined to one CFP. In other words, the receiver signal may include portions of multiple receivers and portions of multiple shots (acoustic signals). These portions are now assigned to the points of the grid.

There are at least three different possibilities of assigning the acoustic recordings to the CFPs. The sorting and/or illustration of the recordings in the CFP combination takes place based on the distance of the CFP from the relevant receiver of the recording. In other words, the portions of the receiver signal may be grouped to the points of the detection grid based on a distance of the points of the detection grid from the receivers of the plurality of receivers and from the at least one signal source of the multiple acoustic signals.

A first possibility is the so-called Real Aperture Processing. In this approach, each shot is processed individually, i.e., the portions of the receiver signal are grouped to the points of the detection grid separately for each acoustic signal. For this purpose, starting from the positions of the receivers and the source, the detection grid (which may be configured in a grid configuration) is spanned by CFPs up to a maximum distance from the source which depends on the properties of the source used (e.g., aperture angle). The tracks, i.e., the recordings of all receivers for one shot of the source, of the shot to be processed are assigned to each CFP/point of the detection grid.

Alternatively, Synthetic Aperture Processing may be used, for example, i.e., processing by means of a synthetic aperture. When using a synthetic aperture, a number of receivers in the direction of movement may be synthetically increased by emitting multiple acoustic signals. Consequently, in this approach, a fixed number of successive shots are combined. In other words, the portions of the receiver signal are grouped to the points of the detection grid for a predefined number of time points combined in the predefined time sequence. Starting from the positions of receivers and shooting points, a CFP grid (detection grid) is spanned. The tracks of the combined shots are assigned to each individual CFP.

Alternatively, the portions of the receiver signal may be assigned purely on the basis of their distance from the points of the detection grid, i.e., all tracks within a certain distance from a CFP are assigned to that CFP. In other words, the portions of the receiver signal may be grouped to the points of the detection grid for a predefined distance of the points of the detection grid from the receivers of the plurality of receivers and from the at least one signal source. The distance should be large enough to include most of the diffraction hyperboloid to be expected. If this distance is chosen too large, the signal quality will decrease. A usable distance may be estimated from the raw data and/or after signal amplification of the diffractions by measuring the size of the contained diffraction hyperboloids.

Subsequently, the travel time correction is performed for the assigned portions of the receiver signal with respect to the points of the detection grid, i.e., a positioning of the receivers and the signal source to the point of the detection grid is included in order to achieve that different distances of the receivers and of the receiver to the respective point are compensated in the combination of the portions of the receiver signal. FIG. 3d illustrates the travel time correction of the receiver signal. By means of an appropriate travel time correction, the diffractions become a coherent seismic event, as shown in FIG. 3d. The aim of the travel time correction is to correct the diffraction signal of an object at the location of the CFP such that it occurs at the same time in all tracks.

Here, reference number 332 shows the travel time corrected diffraction, reference number 334 shows a multiple of the diffraction, and reference number 336 shows model artifacts. FIG. 3d shows the travel time corrected diffractions in the CFP capturing ("CFP gather, Diffraction Move Out (DiffMO)").

Different travel time correction approaches may be followed. For example, a travel time correction may be used at constant velocities, i.e., a constant seismic velocity may be assumed for the travel time correction. This allows for an improved second order travel time correction equation when a constant velocity may be assumed:

The travel time correction at constant velocities described herein is based on a second order travel time calculation for a point diffraction (e.g., Yilmaz 1991: "Seismic data processing"; Sheriff and Geldart 1995; Clearbout 2010). The correction depends on the spatial position of the source of diffraction $D=(x_d, y_d, z_d)$, of the receiver $R=(x_r, y_r, z_r)$, of the source $S=(x_s, y_s, z_s)$ and the root mean square velocity $v_{rms}$:

$$TWT_d = \frac{\sqrt{(x_d - x_s)^2 + (y_d - y_s)^2 + (z_d - z_s)^2}}{v_{rms}} + \frac{\sqrt{(x_d - x_r)^2 + (y_d - y_r)^2 + (z_d - z_r)^2}}{v_{rms}} \qquad \text{Equation 5}$$

Equation 5 may be simplified based on the assumption that the source and receiver are located at the sea surface. This allows both $z_r$ and $z_s$ to be set equal to zero. In addition, the positions of the source and receiver are reduced to their distance from a CFP $$d_{s,r} = \sqrt{(x_d - x_{s,r})^2 + (y_d - y_{s,r})^2}$$

Equation 6

This results in the following simplified travel time equation:

$$TWT_d = \sqrt{\frac{d_s^2}{v_{rms}^2} + \frac{z_d^2}{v_{rms}^2}} + \sqrt{\frac{d_r^2}{v_{rms}^2} + \frac{z_d^2}{v_{rms}^2}}$$

Equation 7

In equation 7, the vertical travel time is contained in the following form:

$$TWT_{d,0} = \frac{2z_d}{v_{rms}}$$

Equation 8

This vertical travel time is constant for a point diffractor in a CFP and thus a DiffMO correction may be derived from Equation 7:

$$TWT_{d,0}(TWT_d, d_s, d_r) = \frac{\sqrt{\frac{(d_s^2 + d_r^2)^2}{v_{rms}^4} - \frac{2TWT_d^2(d_s^2 + d_r^2)}{v_{rms}^2} + TWT_d^4}}{TWT_d}$$

Equation 9

As may be seen in FIG. 3d, this equation corrects a diffraction in a CFP to a horizontal and thus coherent event.

Alternatively, a Radon transform may be used for unknown velocities, for example. One of the most important variables for the previously described travel time correction is the assumed average seismic velocity. If it is not known, the travel time correction may alternatively be performed for a range of possible velocities. In other words, the travel time correction may be performed for a range of possible seismic velocities.

If a diffraction is included in the data of the processed CFP, the stacked signal will show a maximum at the location and with the most appropriate average velocity. For example, a seismic velocity from the range of possible seismic velocities may be selected for the travel time correction based on a magnitude of a local maximum in the corresponding combination of the travel time corrected portions of the receiver signal. By this approach, positions of scattering bodies and average velocities may be determined. This methodology represents a Radon transform as transformation takes place from the signal data space to a velocity data space.

Alternatively, a travel time correction may be used at known velocities. In most cases, it cannot be assumed that the seismic velocity $v_{rms}$ remains constant with increasing travel time, e.g., because of compacted sediments that have an increased seismic velocity. Rather, it may be assumed that this velocity is a function of the travel time: $v_{rms}(TWT)$. Following the nomenclature described above, according to Guigné et al. (2014), a travel time curve for diffractions may also be described using the following equation:

$$TWT_d = 0.5\sqrt{TWT^2(d_s^2)} + 0.5\sqrt{TWT^2(d_r^2)}$$

Equation 10

The terms $$TWT^2(d_s^2) \text{ and/or } TWT^2(d_r^2)$$

separately describe the travel times from the source and from the receivers to the respective CFP to be processed. These travel time equations may be formulated as an equation depending on $v_{rms}(TWT)$ (see for example Yilmaz, 1991). Consequently, seismic velocities matched to different material layers between the plurality of receivers and the points of the detection grid may be used for the travel time correction with respect to the points of the detection grid.

After travel time correction, the tracks within the CFPs (i.e., at each point of the detection grid separately) are summed (combined) and, for example, the number of tracks is divided. A single sum track is created which may correspond to the combination of the portions of the receiver signal, in which the amplitude is plotted against the travel time. If the travel time corrected tracks are now stacked, as shown in FIG. 3e, a clearly recognizable signal amplification results at the time of the coherent event (as stacked diffraction, reference number 342). Consequently, the detection of the one or more objects may already be performed on the combination of the portions of the receiver signal (i.e., without including further method steps), i.e., the one or more objects may be detected based on an amplitude of the combination of the travel time corrected portions of the receiver signal. The travel time (TWT) shown in FIG. 3eh corresponds to the vertical travel time, therefore a conversion to depth may be made if a velocity model exists. This step represents a first statistical evaluation and has, for example, the purpose of suppressing noise and amplifying the signal. Here, all signals that are not diffractions are called noise. The individual tracks may be additionally scaled to compensate for the energy loss due to the spatial propagation of the signal (Spherical Divergence Correction).

In other words, the method, as shown in FIG. 1b, may comprise adjusting 145 the combination of the travel time corrected portions of the receiver signal to achieve a signal amplification of signal portions based on the scattering of the multiple acoustic signals at more distant objects of the one or more objects (for example by means of using the spherical divergence correction). Reference number 344 shows a multiple of the diffraction, which may be caused, for example, by a reflection of the diffraction. In FIG. 3e, the amplitude of the stacked signal is plotted on the x-axis, from −4 to +4×10⁻⁹.

In order to improve the interpretability of the combination of the travel time corrected portions of the receiver signal, a so-called envelope of the combination of the travel time corrected portions of the receiver signal may be calculated. In other words, the method may, optionally, comprise calculating 150 an envelope of the amplitude of the combination of the travel time corrected portions of the receiver signal. The one or more objects may be detected based on the envelope. FIG. 3f illustrates the optional calculation of the envelope of the stacked signal. The optional calculation of the stack envelope, as shown in FIG. 3f, simplifies the illustration of the amplitude of the stack to a single maximum 352. An evaluation of the signal with the phase information is possible and may also include further information about the illustrated point diffractor. The multiple 354 of the diffraction is also visible in FIG. 3*f*. In FIG. 3*f*, the envelope is plotted on the x-axis, on a scale from 0 to approx. $4.5 \times 10^{-9}$.

In addition, a coherence function may optionally be calculated 160 via the combination of the travel time corrected portions of the receiver signal, such as a so-called semblance. In FIG. 3*g*, the semblance/coherence (a similarity or coherence measure) is optionally calculated as a measure of coherence from FIG. 3*d* (the travel time corrected signals). The semblance, i.e., the similarity of the tracks within a CFP over a defined time window, is a measure of the coherence of the travel time corrected signals. In other words, the coherence function may be based on a similarity between temporally successive portions of the receiver signal. For example, the coherence function may be based on a semblance analysis. The use of other coefficients, e.g., correlation coefficients, is conceivable and does not change the general solution path. The one or more objects may be detected based on the coherence function. Reference number 362 indicates that one of the acoustic signal at the diffraction, and reference number 364 indicates the multiple of the diffraction. In FIG. 3*g*, the semblance is plotted on the x-axis (from 0 to 0.4).

If one (optionally) multiplies the chosen measure of coherence (such as the semblance) by the envelope of the stack (so-called weighting of the signal), as shown in FIG. 3*h*, artifacts are attenuated and the resolution is increased, diffractions (reference number 372) may now be easily identified and also easily distinguished from the multiple 374 of the diffraction. In other words, the method may comprise calculating 170 a weighted envelope based on the envelope and based on the coherence function, such as by multiplying the envelope and the coherence function. The weighting results in an improvement of the resolution and informative value. For example, the detection of the one or more objects may be based on the weighted envelope. However, this step is not necessary for the solution path.

In some embodiments, the method may further comprise identifying 180 a reflection of the scattering of the acoustic signal at the one or more objects, such as by removing all other maxima besides a main maximum. The reflection of the scattering of the acoustic signal at the one or more objects may be disregarded in the detection of the one or more objects, either in the detection or by adjusting the combination of the travel time corrected portions of the receiver signal.

The method further comprises detecting 190 the one or more objects at the points of the detection grid based on the combination of the travel time corrected portions of the receiver signal. For example, an object of the one or more objects may be detected when the amplitude of the combination of the travel time corrected portions of the receiver signal, the envelope of the amplitude of the combination of the travel time corrected portions of the receiver signal, or the weighted envelope exceeds a threshold value, for example if the corresponding maximum of the amplitude of the combination of the travel time corrected portions of the receiver signal, of the envelope of the amplitude of the combination of the travel time corrected portions of the receiver signal, or of the weighted envelope matches a position of the point of the detection grid and/or indicates a coherent signal. For example, the method may comprise determining a subsurface model based on the detected one or more objects.

The detection of the one or more objects is based (exclusively) on the scattering of the multiple acoustic signals at the one or more objects, i.e., the reflection of the acoustic signal may, for example, remain unnoticed or disregarded in the detection of the one or more objects.

The data processing method described has the great advantage that by this method, exclusively point diffractions with partly very good resolution may be imaged, and a real-time data processing is possible.

All portions of the wave field other than point diffractions are considered noise in some embodiments and are suppressed as much as possible. The described relative signal amplification of the diffractions initially causes a strong suppression of the reflections which form a dominant part of the wave field. In some embodiments, the subsequent travel time correction corrects (only) point diffractions to coherent events. As a result, (only) point diffractions are amplified by the subsequent stacking. The optional weighting of the stacked data with the semblance represents additional noise suppression and allows an improved interpretation of the results. A grid configuration on CFPs over the survey area shows relative maxima (only) at the locations and depths where point diffractions are found. This allows the spatial position of a variety of existing point diffractors to be determined. Since a large number of data tracks in each CFP are used for evaluation, statistically significant statements may be made.

A very fine resolution is achieved in at least some embodiments because tracks from a wide range around the CFPs are used during sorting. Here, the best possible coverage of the survey area may be ensured in the preceding recording of the data, and aliasing of the data in space may be avoided. The spatial extension of the source and receiver positions during data collection may define how fine the achievable spatial resolution becomes. The larger the extension, the smaller the distance as of which two point diffractions close to each other may be distinguished.

Real-time data processing is possible in at least some embodiments, as the suppression of the reflections is applied to individual shots and synthetic aperture processing is applied to consecutively recorded shots. Thus, in these cases, this method may already provide results during the data recording that may be used for the evaluation.

Unlike techniques that are based on a migration, the disclosure described herein is not very susceptible to errors in the assumed velocity field. When suppressing reflections, the travel time correction for reflections is applied forward and inversely, so that the velocity field assumed here does not distort the tracks. Tests have shown that the travel time correction for the diffractions is not very susceptible to errors in the velocity field. Errors resulting from an erroneous velocity field show up in the accuracy of the localization of the objects, but the ability of the method to detect point diffractors is not significantly affected. Additionally, migration algorithms are significantly more computationally intensive in comparison.

Embodiments create a combination of CFP sorting and Synthetic Aperture Processing to localize point diffractors, which is not yet known in this way.

Point diffractors in marine sediments may be different types of objects, e.g., glacial erratics, other geological inhomogeneities, or UXOs.

The technique is also of interest for geoscientific studies. By means of the methodology described herein, emergence points of fluids, fault surfaces in the subsurface and concretions may be mapped and analyzed, for example.

For example, embodiments may be used with a specific system of signal source and a plurality of receivers. For example, the plurality of receivers may be distributed over an area. This area forms the aperture of the plurality of receivers, i.e., the larger the area, the larger the aperture of the plurality of receivers. Thus, the receivers of the plurality of receivers may be arranged in a regular or irregular grid forming the aperture of the plurality of receivers. The method (and/or the processing module) may detect, based on the scattering of the acoustic signal at the one or more objects, the one or more objects both below the grid (the area, the aperture) and offset from the grid, such as at least 10° offset (or at least 20° offset, at least 30° offset, at least 45° offset). With a large aperture, the angle may be more than 45°.

For example, the acoustic signal may be generated by at least one signal source. The at least one signal source may be arranged at different positions, such as inside or outside the area where the plurality of receivers are arranged. In this respect, the at least one signal source may be an acoustic and/or seismic signal source, such as a GI gun (generator-injector gun), a sparker (sound source with electrical discharge), or a boomer (sound source that stores the energy in capacitors and delivers the same via a flat spiral coil so that water is displaced by an adjacently arranged copper plate). The terms acoustic and seismic may be used interchangeably here as the present approach uses wavelengths that may be allocated to both acoustic and seismic signals.

The at least one signal source and the plurality of receivers may be intended to be towed by a vessel along a water surface above the sea floor. The detection grid may, for example, be a two-dimensional detection grid. The two-dimensional detection grid may be spanned along a direction of travel of the vessel and along a depth axis between the at least one signal source and/or the plurality of receivers and the sea floor. Alternatively, the detection grid may be a three-dimensional detection grid spanned along the direction of travel of the vessel, orthogonal to the direction of travel of the vessel and along the depth axis between the at least one signal source and/or the plurality of receivers and the sea floor.

The interface 12 may, for example, correspond to one or more inputs and/or one or more outputs for receiving and/or transmitting information, such as in digital bit values based on a code, within a module, between modules, or between modules of different entities.

In embodiments, the processing module 14 may correspond to any controller or processor or to a programmable hardware component. For example, the processing module 14 may also be realized as a software programmed for a corresponding hardware component. Therefore, the processing module 14 may be implemented as a programmable hardware with accordingly adapted software. Here, any processors may be used, such as digital signal processors (DSPs). In this context, embodiments are not restricted to a certain type of processor. Any processors or also several processors are conceivable for implementing the processing module 14.

The aspects and features described together with one or more of the previously detailed examples and figures may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Acts, operations, or processes of various above-described methods may be performed by programmed computers or processors. Examples may also cover program storage devices such as digital data storage media, which are machine, processor, or computer readable and encode machine-executable, processor-executable or computer-executable programs of instructions. The instructions perform or cause performing some or all of the steps of the above-described methods. The program storage devices may comprise or be, for example, digital memories, magnetic storage media such as magnetic disks and magnetic tapes, hard drives, or optically readable digital data storage media. Further examples may also cover computers, processors or control units programmed to perform the steps of the above-described methods or (field) programmable logic arrays ((F)PLAs) or (field) programmable gate arrays ((F)PGAs), programmed to perform the steps of the above-described methods.

The description and figures merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, include equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, a network processor, an application specific integrated circuit (ASIC), a field programmable gate array (FPGA), a read only memory (ROM) for storing software, a random access memory (RAM), and non-volatile storage. Other hardware, conventional and/or custom, may also be comprised.

A block diagram may, for instance, illustrate a rough circuit diagram implementing the principles of the disclosure. Similarly, a flow chart, a flow diagram, a state transition diagram, a pseudo code, and the like may represent various processes, operations, or acts, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps, or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation, or step may include or may be broken into multiple sub-acts, -functions, -processes, -operations or -steps, respectively. Such sub acts may be included and be part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to also include features of a claim for any other independent claim even if this claim is not directly made dependent on the independent claim.

The invention claimed is:

1. A method of detecting one or more objects in a sea floor, the method comprising:

transmitting, from one or more acoustic signal sources, a plurality of acoustic signals into the sea floor, wherein a wavelength of the plurality of acoustic signals is selected to be of the same order of magnitude as an expected size of the one or more objects;

obtaining, from a plurality of acoustic receivers, a receiver signal, the receiver signal comprising electrical waveforms generated in response to acoustic pressure waves scattered by the plurality of acoustic signals at the one or more objects in the sea floor;

generating a detection grid, the detection grid representing a grid at the points of which the one or more objects are being localized, the detection grid extending both below an area spanned by the plurality of receivers and offset from the area;

grouping portions of the receiver signal to points of the detection grid;

performing a travel time correction of the portions of the receiver signal with respect to the points of the detection grid to align the electrical waveforms generated by the scattering into a coherent seismic event;

combining the travel time corrected portions of the receiver signal at the points of the detection grid; and detecting the one or more objects at the points of the detection grid both below the area spanned by the plurality of receivers and offset from the area based on the combination of the travel time corrected portions of the receiver signal, wherein the detection of the one or more objects is based on the scattering of the multiple acoustic signals at the one or more objects.

2. The method of claim 1, wherein the one or more objects are detected based on an amplitude of the combination of the travel time corrected portions of the receiver signal.

3. The method of claim 2, further comprising calculating an envelope of the amplitude of the combination of the travel time corrected portions of the receiver signal, wherein the one or more objects are detected based on the envelope.

4. The method of claim 3, further comprising calculating a coherence function based on the combination of the travel time corrected portions of the receiver signal, wherein the coherence function is based on a similarity between temporally successive portions of the receiver signal, wherein the one or more objects are detected based on the coherence function.

5. The method of claim 4, further comprising calculating a weighted envelope based on the envelope and based on the coherence function.

6. The method of claim 4, wherein the coherence function is based on a semblance analysis.

7. The method of claim 1, further comprising scaling the respective travel time corrected portions of the receiver signal to achieve a signal amplification of signal portions based on the scattering of the multiple acoustic signals at more distant objects of the one or more objects.

8. The method of claim 1, further comprising identifying a reflection of the scattering of the acoustic signal at the one or more objects, wherein the reflection of the scattering of the acoustic signal at the one or more objects is disregarded in the detection of the one or more objects.

9. The method of claim 1, wherein a constant seismic velocity is assumed for the travel time correction.

10. The method of claim 1, wherein the travel time correction is performed for a range of possible seismic velocities, wherein a seismic velocity is selected for the travel time correction from the range of possible seismic velocities based on a magnitude of a local maximum in the corresponding combination of the travel time corrected portions of the receiver signal.

11. The method of claim 1, wherein seismic velocities matched to different material layers between the plurality of receivers and the points of the detection grid are used for the travel time correction with respect to the points of the detection grid.

12. The method of claim 1, wherein the portions of the receiver signal are grouped to the points of the detection grid based on a distance of the points of the detection grid from the receivers of the plurality of receivers and from at least one signal source of the multiple acoustic signals.

13. The method of claim 12, wherein the portions of the receiver signal are grouped to the points of the detection grid separately for each acoustic signal.

14. The method of claim 12, wherein the portions of the receiver signal are grouped to the points of the detection grid for a predefined number of time points combined in the predefined time sequence.

15. The method of claim 12, wherein the portions of the receiver signal are grouped to the points of the detection grid for a predefined distance of the points of the detection grid from the receivers of the plurality of receivers and from at least one signal source.

16. The method of claim 1, wherein the receiver signal comprises a first signal portion based on the scattering of the multiple acoustic signals at the one or more objects, and wherein the receiver signal comprises a second signal portion based on a reflection of the multiple acoustic signals, wherein the method comprises suppressing the second signal portion compared to the first signal portion, wherein grouping the portions of the receiver signal, performing the travel time correction, combining the travel time corrected portions, and/or detecting the one or more objects are based on the first signal portion.

17. The method of claim 16, wherein suppressing the second signal portion is based on an eigenvalue decomposition of a travel time corrected version of the receiver signal.

18. The method of claim 1, comprising suppressing, in the receiver signal, a reflection of the multiple acoustic signals.

19. A non-transitory, computer-readable medium having a program code for performing a method of detecting one or more objects in a sea floor when the program code is executed on a computer, a processor, a control module, or a programmable hardware component, the method causing the computer, the processor, the control module, or the programmable hardware component to:

activate an at least one acoustic signal source to transmit a plurality of acoustic signals into the sea floor, wherein a wavelength of the plurality of acoustic signals is selected to be of the same order of magnitude as an expected size of the one or more objects;

obtain, from a plurality of acoustic receivers, a receiver signal comprising electrical waveforms generated in response to acoustic pressure waves scattered by the plurality of acoustic signals at the one or more objects in the sea floor;

generate a detection grid, the detection grid representing a grid at the points of which the one or more objects are being localized, the detection grid extending both below an area spanned by the plurality of acoustic receivers and offset from the area;

group portions of the receiver signal to points of the detection grid;

perform a travel-time correction of the portions of the receiver signal with respect to the points of the detection grid to align the electrical waveforms generated by the scattering into a coherent seismic event;

combine the travel-time-corrected portions of the receiver signal at the points of the detection grid; and detect the one or more objects at the points of the detection grid both below the area spanned by the plurality of acoustic receivers and offset from the area based on the combination of the travel-time-corrected portions of the receiver signal, wherein the detection of the one or more objects is based on the scattering of the plurality of acoustic signals at the one or more objects.

20. An apparatus for detecting one or more objects in a sea floor, the apparatus comprising:

an interface coupled to at least one acoustic signal source and a plurality of acoustic receivers, and a processing module configured to:

activate the at least one acoustic signal source to transmit a plurality of acoustic signals into the sea floor, wherein a wavelength of the plurality of acoustic signals is selected to be of the same order of magnitude as an expected size of the one or more objects;

obtain, from the plurality of acoustic receivers, a receiver signal comprising electrical waveforms generated in response to acoustic pressure waves scattered by the plurality of acoustic signals at the one or more objects in the sea floor;

generate a detection grid, the detection grid representing a grid at the points of which the one or more objects are being localized, the detection grid extending both below an area spanned by the plurality of receivers and offset from the area;

group portions of the receiver signal to points of a detection grid, perform a travel time correction of the portions of the receiver signal with respect to the points of the detection grid to align the electrical waveforms generated by the scattering into a coherent seismic event, combine the travel time corrected portions of the receiver signal at the points of the detection grid, and detect the one or more objects at the points of the detection grid both below the area spanned by the plurality of receivers and offset from the area based on the combination of the travel time corrected portions of the receiver signal, wherein the detection of the one or more objects is based on the scattering of the multiple acoustic signals at the one or more objects.

* * * * *